United States Patent [19]
Naegeli et al.

[11] Patent Number: 5,584,178
[45] Date of Patent: Dec. 17, 1996

[54] EXHAUST GAS COMBUSTOR

[75] Inventors: David W. Naegeli; Michael E. Crane, both of San Antonio, Tex.

[73] Assignee: Southwest Research Institute, San Antonio, Tex.

[21] Appl. No.: 259,423

[22] Filed: Jun. 14, 1994

[51] Int. Cl.$^6$ .................................................. F01N 3/26
[52] U.S. Cl. ............................................. 60/303; 60/749
[58] Field of Search ............................. 60/303, 274, 749

[56] References Cited

U.S. PATENT DOCUMENTS

| | | |
|---|---|---|
| 1,605,484 | 11/1926 | Thompson et al. . |
| 1,834,126 | 12/1931 | Hyatt . |
| 2,038,567 | 4/1936 | Ittner . |
| 2,981,065 | 4/1961 | Sloan .................................. 60/749 |
| 3,030,773 | 4/1962 | Johnson .............................. 60/749 |
| 3,065,595 | 11/1962 | Gary . |
| 3,146,072 | 8/1964 | Morgan ............................... 60/303 |
| 3,170,280 | 2/1965 | Rees .................................... 60/303 |
| 3,435,613 | 4/1969 | Eannarino ........................... 60/303 |
| 3,654,763 | 4/1972 | Ito et al. . |
| 3,683,625 | 8/1972 | McCrink .............................. 60/276 |
| 3,716,996 | 2/1973 | Maruoka . |
| 3,751,914 | 8/1973 | Pollock . |
| 3,775,064 | 11/1973 | Berger et al. . |
| 3,785,153 | 1/1974 | Sohwing . |
| 3,800,772 | 4/1974 | Gospodar . |
| 3,813,878 | 6/1974 | McKee ................................. 60/303 |
| 3,854,288 | 12/1974 | Heitland et al. . |
| 3,877,229 | 4/1975 | Resler, Jr. . |
| 3,952,507 | 4/1976 | Bonarski ............................. 60/303 |
| 4,209,981 | 7/1980 | Miyamori et al. . |
| 4,359,863 | 11/1982 | Virk et al. . |
| 5,207,058 | 5/1993 | Sasaki et al. . |
| 5,263,318 | 11/1993 | Oota et al. . |
| 5,277,025 | 1/1994 | Gonze et al. . |

*Primary Examiner*—Douglas Hart
*Attorney, Agent, or Firm*—Robert C. Curfiss; Butler & Binion, L.L.P.

[57] ABSTRACT

A combustor for burning the untreated exhaust of an internal combustion engine heats and burns the exhaust prior to release into the atmosphere, or prior to introduction into a downstream treatment system such as a catalytic converter. The combustor defines a novel, passive flame holder in combination with an igniter, whereby the exhaust continues to burn, without assist, once ignited. Managed air injection may be employed. The combustor is configured to fit within standard exhaust systems with a minimum of modification to the overall exhaust assembly. The combustor is particularly useful in cold start conditions for increasing the temperature of the exhaust to catalytic converter operating temperatures and for use in small engine applications where exhaust has heretofore been released untreated.

7 Claims, 3 Drawing Sheets

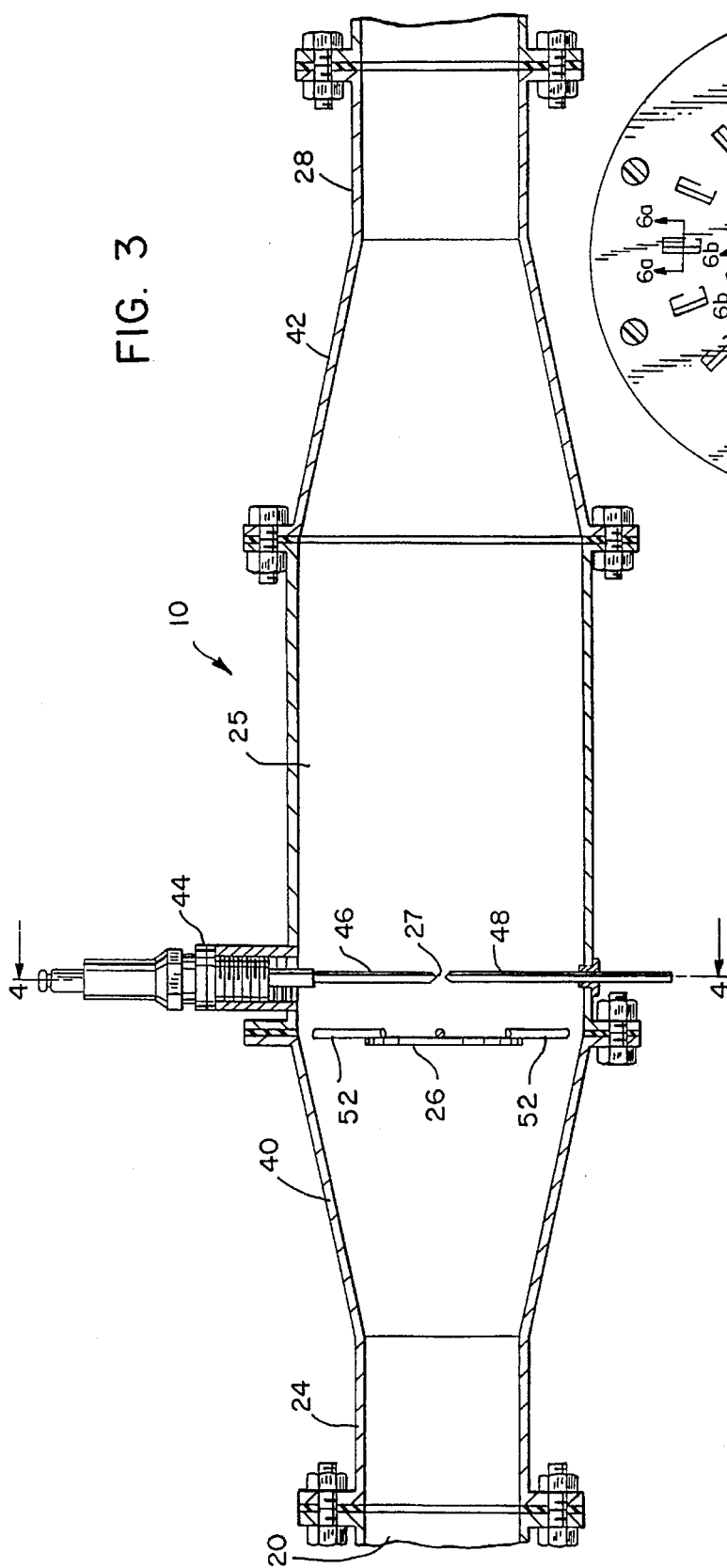
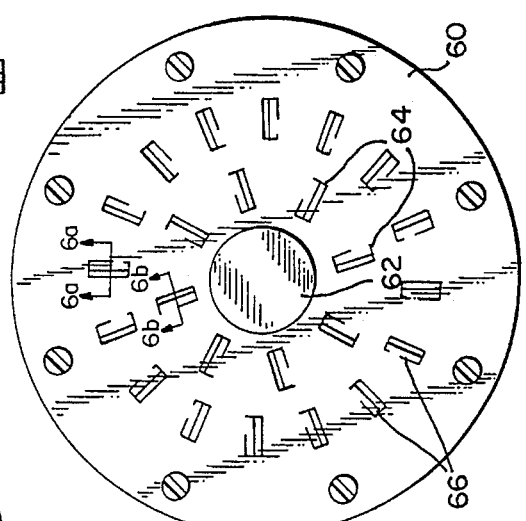
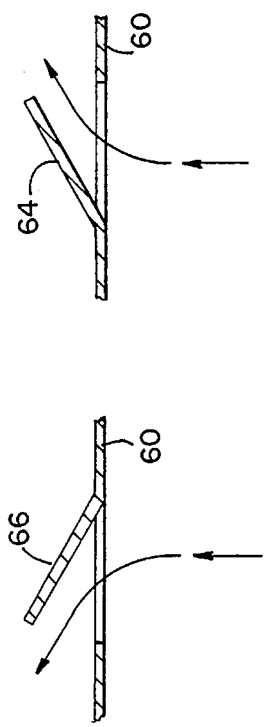
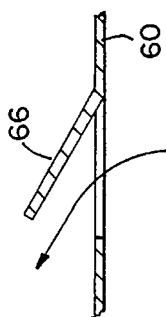

EXHAUST GAS COMBUSTOR

BACKGROUND OF THE INVENTION

1. Field of the Invention

The subject invention is generally related to a means and method for treating exhaust emissions from an internal combustion engine and is specifically directed to an exhaust gas combustor for igniting and burning untreated exhaust gases released from an internal combustion engine.

2. Description of the Prior Art

It is known to treat exhaust gases as they are released from an internal combustion engine. Typically, present day automobiles incorporate a catalytic convertor downstream of the exhaust for converting harmful emissions to less toxic, cleaner exhaust. Most vehicles now routinely incorporate catalytic conversion systems. In fact, catalytic converters are present on all automobiles now sold in the United States and significantly reduce tailpipe emissions of hydrocarbons, carbon monoxide and nitrous fumes.

While such systems have gained widespread acceptance for highway vehicles, similar suitable converter systems have not been developed for other internal combustion engines. This is particularly true for small engine applications, including both four-stroke and two-stroke designs. In reality, the emissions from such engines are more harmful to the atmosphere and environment than the emissions from highway vehicles since such engines generally run fuel rich, releasing larger concentrations of more toxic exhausts than the typical untreated exhaust of an automobile or truck. At the present time, catalytic converters have not gained widespread acceptance in such applications because of the incremental cost factor and, in some cases, the restricted space and weight requirements for small engine applications.

Further, while catalytic converters have greatly reduced harmful emissions in general, the converters do not operate efficiently until the exhaust gases reach a temperature range within the optimum operating range of the converter. This generally takes several minutes of operation after a cold start.

In fact, present day automobiles emit upwards of 80 percent of their total mass emissions during the first sixty seconds of operation when tested under the current EPA Federal Test Procedure. This is primarily due to a cold and therefore, ineffective catalytic converter. Typically, these catalysts must be at an operating temperature of approximately 300° C. before they are effective at reducing emissions.

These problems have been well documented, and there have been numerous prior art attempts to either provide alternative emissions control or to further increase the efficiency of catalytic converters. One of the more popular methods of accelerating catalyst temperature is to electrically heat the catalyst substrate. However, this is inefficient and requires that the passenger wait before starting the vehicle so that the electrically heated catalyst can preheat. In addition, more equipment is generally required, such as an auxiliary battery and the like, further increasing the price penalty associated with incorporation of such systems.

Over the years, other systems have been developed for heating exhaust emissions to produce a cleaner exhaust. An early attempt is shown in U.S. Pat. No. 1,605,484, entitled: "Method of and Apparatus for Treating Exhaust Gases" issued to C E. Thompson, et al, on Nov. 2, 1926. As there shown, a secondary combustion is achieved under controlled conditions to further burn the untreated emissions from an internal combustion engine. A supplemental flame is utilized in a secondary chamber. An auxiliary battery supply is utilized to supply electrical ignition to the flame chamber. A secondary source of fuel may also be employed to enhance the secondary combustion cycle. Similar ideas are shown in U.S. Pat. Nos. 1,834,126; and 3,065,595. None of these devices have gained widespread acceptance because they have proven to be relatively inefficient, expensive to manufacture and operate, often requiring additional ignition circuits as well as secondary fuel delivery, and inordinate space requirements making them impractical to incorporate in typical automobiles.

More recently, U.S. Pat. No. 5,207,058, entitled: "Internal Combustion Engine" issued to S. Sasaki, et al, on May 4, 1993 discloses an exhaust purifying system for a direct injection engine, utilizing an ante-chamber in the exhaust tract. This system is only applicable to direct injection engines and the ante-chamber is not capable of sustaining combustion.

U.S. Pat. No. 5,263,318, entitled: "After-burner System" issued to N.Oota, et al, on Nov. 23, 1993 discloses a system incorporating hydrogen stored in a reforming tank and injected into the exhaust, requiring not only an extra injector but also a source of hydrogen, making it impractical for widespread application.

U.S. Pat. No. 5,277,025, entitled: "Exhaust Burner Control" issued to E. V. Gonze, et al, on Jan. 11, 1994, discloses a control system for an internal combustion exhaust gas heater and provides air and fuel to the heater in appropriate proportions to promote proper ignition. An external fuel injector is required and additional fuel is consumed during the burning cycle.

While numerous methods and apparatus have been disclosed directed toward the afterburning of internal combustion exhausts, none have gained acceptance because they either are impractical due to size or costs, or because they do not deal with cold starting issues, per se, and therefore, do not enhance the effects of the already accepted catalytic converter systems incorporated in many applications. Therefore, there remains a need for a practical method and apparatus for burning internal combustion exhaust to provide a rapid heating of the catalytic substrate to promote more efficient catalytic operation, particularly during cold start. In addition, there is a continuing need for an effective, inexpensive and unencumbering method and apparatus for treating the heretofore untreated exhausts of small engine applications.

SUMMARY OF THE INVENTION

The subject invention is directed to an exhaust gas combustor which is in line with the exhaust from an internal combustion engine and is adapted to heat the exhaust to provide a heated substrate as input to a catalytic converter, providing an operating temperature range of approximately 300° C. almost simultaneously with cold start of the engine. The embodiments of the subject invention are also well-suited for treating the heretofore untreated exhaust from small engine applications with or without the incorporation of additional treatment systems.

In its preferred form, the invention includes a combustion chamber in line with the exhaust from the engine. A flame holder is provided in the chamber for stabilizing a flame, once ignited, utilizing only the exhaust as fuel. An air mixing device may be incorporated, as desired, to further enhance combustion. Further, in multiple cylinder engines, it has been found that the air ratio can be enhanced simply by shutting off the fuel to one of the cylinders during cold start condition, thereby pumping a higher ratio of air through the system.

Where desired, an oxygen sensor may be employed downstream of the combustor. A closed loop control system may be employed to control the fuel/air mixture to optimize combustion. All of this may be accomplished with the only required additional mechanical equipment being the combustor itself. In the preferred embodiments, the combustor is a closed, generally cylindrical can having an axial inlet and an axial outlet at opposite ends. The combustor does not require a substantial amount of increased space and is easily incorporated in most exhaust systems. For example, in a 5 centimeter exhaust tube, the combustor has a reaction chamber or zone of an overall length of approximately 40-45 centimeters and a maximum diameter of less than 10 centimeters. This permits incorporation in most automobile exhaust systems without greatly modifying the design. Comparable ratios will exist for smaller exhaust tubes, making the combustor satisfactory for small engine applications.

In one embodiment, a novel disk is positioned near the inlet side of the can, with a spark or igniter device (typically a spark plug) downstream of the disk. The disk modifies or conditions the exhaust flow to provide a stabilized flame which will continuously burn once ignited, both heating and further burning the fuels in the exhaust gases. Numerous flame holder configurations have been incorporated with successful results.

In an alternative embodiment, a dump type combustor is utilized, wherein the expansion chamber defined by the can provides the stabilizer for defining the flame holder. This is a passive system which permits utilization of the combustor without pressurizing the exhaust.

When used in combination with a catalytic converter, the combustor of the subject invention provides a means and method for reducing tailpipe emissions from automotive, gasoline-fueled, internal combustion engines during initial cranking and starting by improving catalyst efficiency. The combustor of the subject invention also provides a means and method for reducing emissions from non-automotive, gasoline-fueled, internal combustion engines due to consumption of hydrocarbons and carbon monoxide in the stabilized flame. The flame holder designs of the combustor of the subject invention are sufficiently efficient that non-spark-assisted ignition is achievable with a resultant high heat release zone. The ignition system can be shut off immediately following successful ignition so that combustion is self-sustaining.

Additional benefits are a reduced load on catalytic converters to oxidize hydrocarbons and carbon monoxide, and to maintain oxides of nitrogen at acceptable levels during cold start conditions.

Also, incorporation of the combustor in catalyzed systems permits placement of the catalytic converter at a position further from the engine manifold since the combustor provides a heated substrate. This reduces the risk of thermal poisoning of the converter.

Deposit build-up in the converter is also reduced since any unburned oil is consumed in the combustor in advance of the converter.

Consumer benefits include the elimination of waiting time now required with electrical pre-heat systems, incorporation of a cleaner exhaust system with a minimum of additional equipment and expense, and minimal reduction in fuel efficiency of the engine.

It is, therefore, an object and feature of the subject invention to provide a method and apparatus for heating the exhaust of an internal combustion engine to rapidly heat the substrate of a catalytic converter during cold start conditions.

It is also an object and feature of the subject invention to provide an exhaust combustor for combusting the exhaust gases of an internal combustion engine to further reduce the exhaust emissions.

It is yet another object and feature of the subject invention to provide a combustor which may be incorporated in the exhaust system of an internal combustion engine with minimum modification and minimum cost.

It is an additional object and feature of the subject invention to provide a combustor that can be readily incorporated in small engine applications without greatly impacting the size/weight considerations of the application.

Other objects and features of the invention will be readily apparent from the accompanying drawings and detailed description of the preferred embodiments.

BRIEF DESCRIPTION OF THE DRAWINGS

FIG. 3 is a longitudinal cross-section of the combustor of FIG. 2.

FIG. 5 is an alternative embodiment of the disk for use in the combustor of FIG. 2.

FIGS. 6a and 6b are enlarged fragmentary views of FIG. 5, illustrating the flow of exhaust gases through the finned openings.

DETAILED DESCRIPTION OF THE PREFERRED EMBODIMENTS

Figure 1:
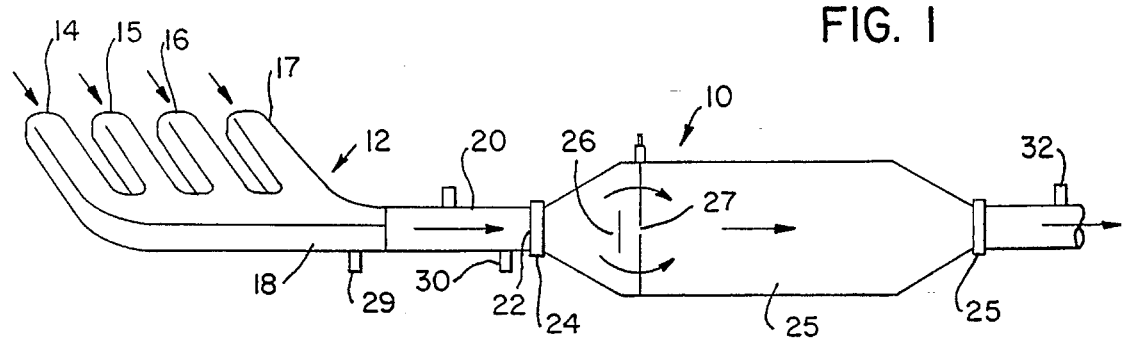
FIG. 1 is a diagram of an engine and exhaust system incorporating the method and apparatus of the subject invention.

With specific reference to FIG. 1, the combustor 10 of the subject invention is adapted to be positioned inline in the exhaust of a typical internal combustion gasoline fueled engine. In a common arrangement, the exhaust products of the engine are released into an exhaust manifold 12 at one or more exhaust runners 14, 15, 16, 17. In most cases, each exhaust runner 14—17 of the manifold is connected directly to an exhaust port for a single cylinder in the engine. The untreated exhaust from each cylinder is combined at the manifold and is released through the manifold outlet 18 into an exhaust tube 20.

In prior art systems, a catalytic converter (not shown) was connected directly to the outlet 22 of the exhaust tube. It was desirable to place the converter as close to the manifold as practical, thereby relying on exhaust heat to rapidly increase the substrate to an elevated temperature for increasing the efficiency of the converter operation during cold start.

In the subject invention, the outlet 22 of the exhaust tube is connected directly to the inlet 24 of the combustor 10. The inlet directs the exhaust flow into a combustion chamber 25, which in the illustrated embodiments is in axial alignment with the exhaust tube, but is of an enlarged cross section. In the preferred embodiment, the chamber is of a generally cylindrical cross-section, with a diameter which is slightly less than twice that of the exhaust tube. A flame stabilizer or holder 26 is positioned in the chamber 25 near the inlet 24. As the exhaust is introduced from the exhaust tube 20 and inlet 22 into the chamber 25, it is ignited by an igniter 27, positioned downstream of the flame holder. Once ignited, the exhaust will continue to burn without additional support. The combusted fuel is then released from the chamber 25 through outlet 28, which may be an exhaust to the atmosphere or may provide a connector to the inlet of a downstream exhaust treatment system such as, by way of example, a typical catalytic converter.

The exhaust released at combustor outlet 28 is substantially cleaner than the untreated exhaust in the exhaust tube 20, with a reduction in hydrocarbons and carbon monoxide, and an acceptable level of oxides of nitrogen as a result of the continuous combustion of the untreated exhaust from the manifold. In addition, the exhaust released at outlet 28 is also of a substantially elevated temperature, quickly reaching and maintaining a temperature in excess of 300° C., which is the threshold operating temperature of a typical catalytic converter, greatly increasing the efficiency of the converter, particularly during cold crank and cold start conditions. Further, by providing a high temperature exhaust at the outlet of the combustor, the converter can be placed much further from the manifold since the manifold temperature is no longer required to heat the exhaust to converter operating range. This reduces the thermal poisoning of the converter. Also, by burning the untreated exhaust, any released oil is combusted, reducing the build up of deposits in the converter.

Of course, the cleaner exhaust in outlet 28 can also be released directly in the atmosphere, making the combustor of the subject invention ideal for use with air-cooled, small engine or marine engine applications where untreated exhaust is typically released directly into the atmosphere. The compatible size of the combustor, and its favorable cost compared to catalytic systems make it a desirable alternative exhaust treatment system in such applications.

While not necessary in some applications, the invention may include various forms of air injection to enhance combustion in the chamber 25, as desired. As shown in FIG. 1, one or more air injection taps 29, 30 may be provided upstream of the combustor inlet 24. When air injection is utilized, it is desirable to place an oxygen sensor 32 downstream of the combustor to monitor the air ratio in the exhaust, in order to optimize combustion. As is well known to those skilled in the art, the sensor 32 may be connected to a control system for regulating the flow of air injected into the exhaust through the tap 29 or 30. It has been found that the air ratio may also be increased by reducing or cutting off the flow of fuel into one of the cylinders of a multiple cylinder engine, particularly during cold start conditions. This also increases the air ratio and can enhance combustion in the chamber 25. In such circumstances, it is contemplated that fuel flow would be regulated by a control system which is responsive to the sensor 32, in the well known manner.

It is a particular advantage of the subject invention that the fuel/air ratio in the combustor can be regulated with the use of additional fuel injection, thereby increasing the overall efficiency of the exhaust treatment system. Also, particularly in unregulated systems not requiring any air injection, the amount of modification to the exhaust system and to the overall assembly is minimal, greatly reducing cost penalties. Even in cases where air regulation is desired or required, the control system may rely on the on board engine management system available in most applications currently available.

Figure 2:
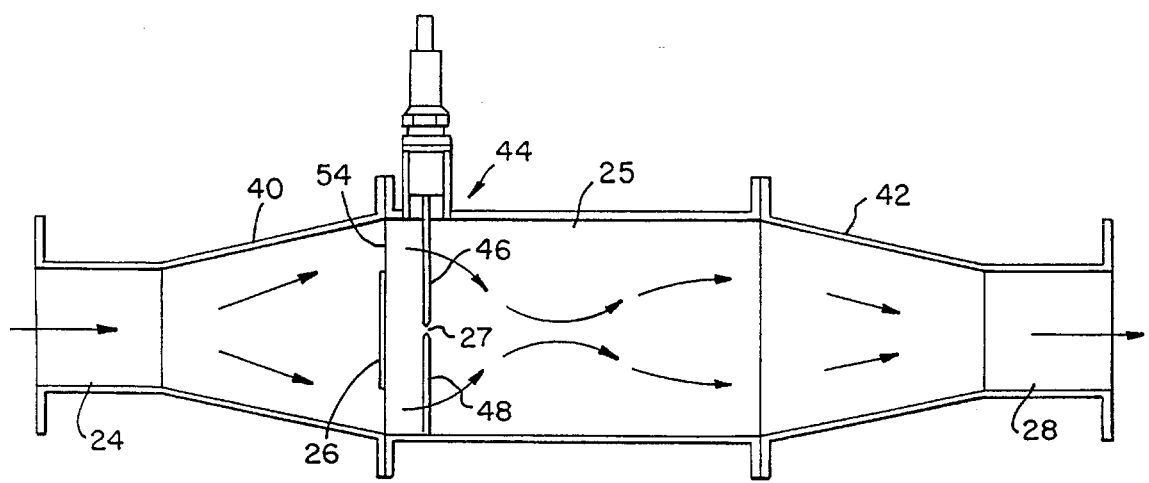
FIG. 2 is a schematic diagram of a first embodiment of the combustor of the subject invention, incorporating a disk flame stabilizer.
Figure 4:
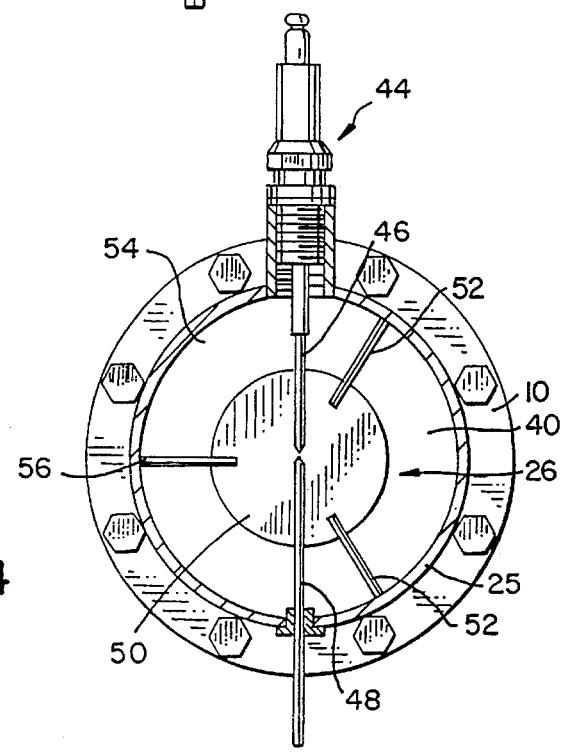
FIG. 4 is a section view taken along line 4—4 of FIG. 2, showing the disk flame holder and the ignition gap.

A first embodiment of the combustor 10 is shown in FIGS. 2—4, with an alternative stabilizer disk shown in FIG. 5. With specific reference to FIGS. 2 and 3, the chamber 25 of the combustor is a generally cylindrical can having a diameter of approximately 9 cm when used in conjunction with an exhaust tube 20 (see FIG. 1) of a 5 cm diameter. The can is approximately 15 cm long. Expansion/reducer sections 40, 42 are in communication with the inlet 24 and the outlet 28 and provide a smooth transition from the exhaust diameter to the can diameter. In the preferred embodiment, the reducers are tapered sections having an included angle of approximately 24°, resulting in a length of approximately 9 cm. The overall length of the combustor, including inlet 24, the chamber or can 25, outlet 28 and the expansion/reducer sections 40, 42, is approximately 40—45 cm.

As best seen in FIGS. 2 and 3, an igniter mechanism 44 is positioned downstream of the inlet side of the can 25. Typically a spark plug may be used, with a modified gap at igniter 27 provided by a modified electrode 46 extending into the can and an opposite modified ground rod 48.

A flame holder 26 is positioned in advance of the igniter gap 27 and at the junction between the expander/reducer 40 and the can 25. As best seen in FIG. 4, the flame holder 26 comprises a disk 50 positioned with its center in axial alignment with the gap 27. In the illustrated embodiment, the disk is approximately 3 cm in diameter. A plurality of spokes or supports 52 hold the disk in place and provide a circumferential gap 54 through which the exhaust enters the can. In the preferred embodiment, the cross-sectional area of the circumferential gap is approximately equal to the cross-sectional area of the inlet 24 to provide a system with minimum pressure loss. As the exhaust passes through the circumferential gap, it converges at the igniter 27 and is ignited. Once ignited, it will continue to burn without further assist.

An alternative stabilizer disk 60 is shown in FIG. 5. The disk 60 is a plate spanning the entire inlet opening of the can 25 at the junction between the expander/reducer 40 and the can. The disk includes a center hole 62, of a diameter of approximately 1.5 cm and in axial alignment with the igniter gap 27. Spaced radially outwardly of the center hole 62 are a plurality of finned inlets 64. Each of the fins points toward the can and is at an angle of 30° (see FIG. 6a). Each inlet 64 is approximately 0.5 by 1.0 cm. In the preferred embodiment, the center hole 62 is of a diameter of approximately 9 cm and the inlets 64 are on a radius of 3–4 cm. Outboard of the inlets 64 are additional finned inlets 66 of the same size and positioned on a radius of 7–8 cm. The fins of each inlet 66 also point toward the can and are at an angle of 30°. In the preferred embodiment, there are eight equally angularly spaced inlets 64 and sixteen equally angularly spaced inlets 66. It will be noted from FIGS. 6a and 6b that the position of the fins create a clockwise swirl in one group (fins 64 as drawn) and a counterclockwise swirl in the other group (fins 66 as drawn), increasing the turbulence of the flowing exhaust gases. By using the finned inlets, the pressure reduction is minimal even though the combined area of the finned openings is somewhat less than the cross-sectional area of the combustor inlet. This coupled with the center hole, creates a high turbulence at igniter gap 27. In this embodiment, the turbulent exhaust is ignited at gap 27 and continues to burn without further assist.

Figure 7:
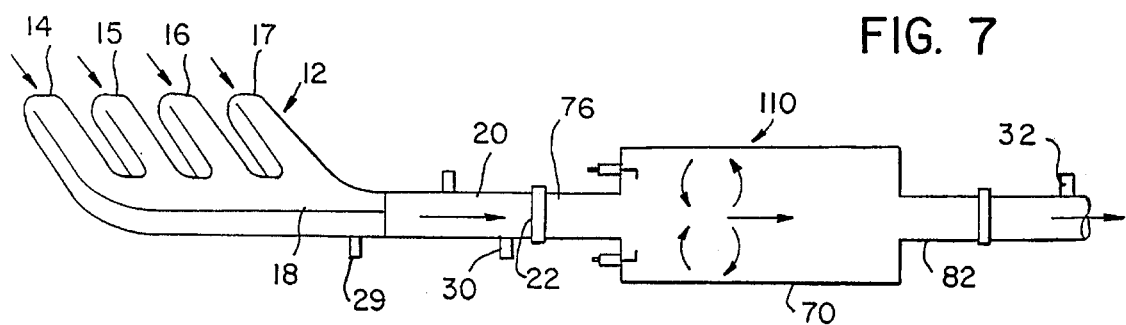
FIG. 7 is a diagram of an alternative embodiment of the combustor of the subject invention, incorporating a dump flame stabilizer.
Figure 8:
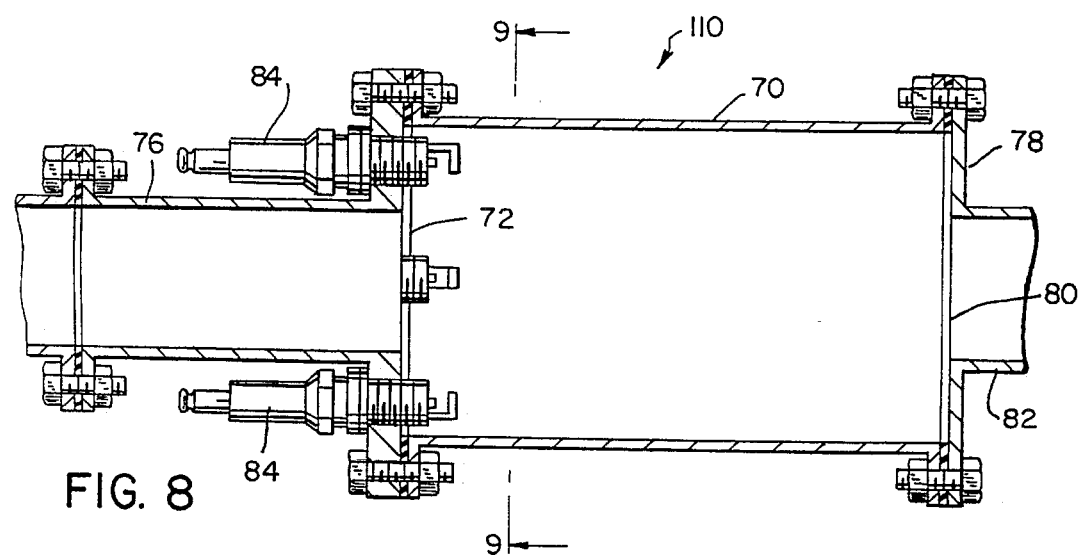
FIG. 8 is a longitudinal cross-section of the combustor of FIG. 7.
Figure 9:
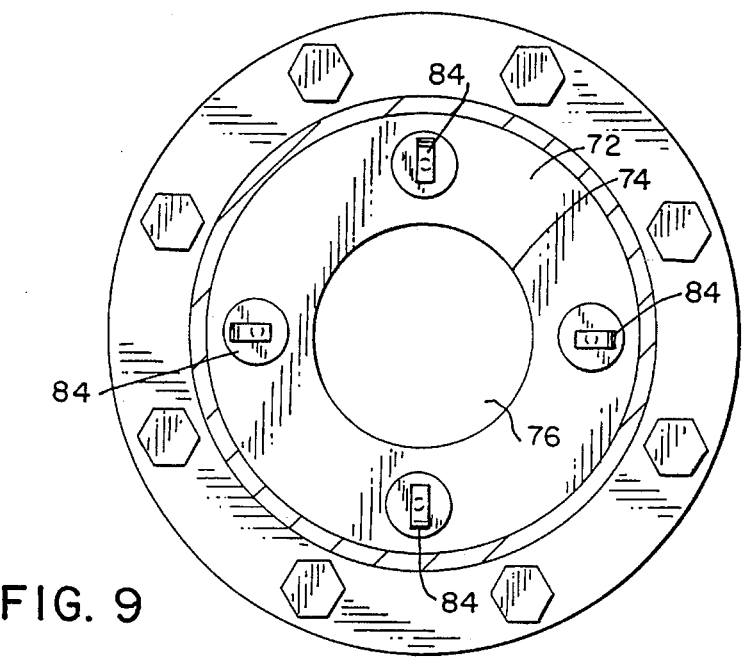
FIG. 9 is a section view taken at line 9—9 of FIG. 7, showing the inlet flange of the dump combustor and the position of the ignition gaps.

An alternative embodiment of the combustor of the present invention is shown in FIGS. 7–9. As there shown, the combustor 110 comprises a cylindrical can 70 defining a combustion chamber. In the preferred embodiment, the can is approximately 9 cm in diameter and 20 cm long when used in conjunction with a 5 cm exhaust tube 20 (also see FIG. 1). As best seen in FIGS. 8 and 9, the inlet end plate or flange 72 of the can is a substantially flat disk with a center opening 74 which is the same size as the internal diameter of the combustor inlet tube 76. The inlet tube 76 is of the same diameter as the exhaust tube, and where desired, the exhaust tube may be connected directly to the combustor inlet plate 72. The outlet plate or flange 78 is also a flat disk with a center opening 80 of the same size as the outlet tube 82 and the exhaust tube (see FIG. 1). The combustor 110 is positioned in the system in the same location as the combustor 10, as shown in FIG. 1.

A plurality of spark igniters 84 are positioned radially about the inlet flange 72. Typically, common spark plugs may be used and are positioned with the gap as close to the can wall as possible. In the preferred embodiment, four spark plugs are positioned at 90° spacing about the flange. The specific shape of the chamber creates a rapid expansion zone at the inlet end and a rapid reduction at the outlet end of the can. This produces an area of weak circulation at the area in the vicinity of the igniters 84 and an area of strong circulation downstream. It has been found that this configuration adequately supports and stabilizes a flame once ignited by the igniters and that the exhaust will continue to burn without assist. The embodiment of FIGS. 7–9 is simple, inexpensive and effective for providing a cleaned, heated exhaust either for release to the atmosphere or for downstream treatment at a catalytic converter or the like.

While certain embodiments and features of the invention have been described in detail herein, it will be readily understood that the invention incorporates all enhancements and modifications within the scope and spirit of the following claims.

What is claimed is:

1. An exhaust combuster for burning the exhaust gases emitted into an exhaust tube of a predetermined cross-sectional area from an internal combustion engine, the combuster comprising:

a. a combustion chamber of a cross-sectional area larger than the cross-sectional area of the exhaust tube;

b. an inlet port in the combustion chamber and of a cross-sectional area approximately the same size as the cross-sectional area of the exhaust tube;

c. a flame holder in the combustion chamber and positioned to direct the exhaust gases entering through the inlet port, comprising a plate positioned downstream of the inlet port for intercepting the exhaust gases as they enter into the combustion chamber, wherein the plate is a disk positioned in coaxial relationship with the inlet port and is of a diameter substantially equal to the diameter of the combustion chamber, the disk including a plurality of openings therein, through which the exhaust gases pass, the openings configured to create a turbulent flow downstream of the disk and in the combustion chamber, wherein the plurality of openings in the disk comprise. (i) a first set of openings each including a fin associated therewith for directing the exhaust gases in a clockwise direction about the axis of the combustion chamber, (ii) a second set of openings each including a fin associated therewith for directing the exhaust gases in a clockwise direction about the axis of the combustion chamber;

d. an igniter in the combustion chamber and positioned in the flow of exhaust gases generated by the flame holder, whereby the exhaust gases are ignited and burned in the combustion chamber; and e. an outlet port for releasing the burned exhaust gases from the combustion chamber.

2. The combustor of claim 1, the outlet port having a cross-sectional area approximately the same size as the cross-sectional area of the exhaust tube.

3. The combustor of claim 1, wherein the igniter comprises an electrode and a ground positioned to define a gap therebetween at the point of convergence and a control element for generating a spark at the gap for igniting the gases.

4. The combustor of claim 3, wherein the control element is a spark plug.

5. The combustor of claim 1, further including a center hole in the disk and in axial alignment with the igniter gap.

6. The combustor of claim 1, further including an expansion chamber between the inlet and the combustion chamber.

7. The combustor of claim 6, further including a reducing chamber between the combustion chamber and the outlet.

* * * * *

UNITED STATES PATENT AND TRADEMARK OFFICE
CERTIFICATE OF CORRECTION

PATENT NO. : 5,584,178
DATED : December 17, 1996
INVENTOR(S) : Naegeli et al.

It is certified that error appears in the above-indentified patent and that said Letters Patent is hereby corrected as shown below:

In Column 8, line 22, before the word "direction" delete the word "clockwise" and insert --counterclockwise-- in its place.

Signed and Sealed this

Seventeenth Day of October, 2000

Attest:

Q. TODD DICKINSON

*Attesting Officer*   *Director of Patents and Trademarks*